(12) United States Patent
Bailey et al.

(10) Patent No.: US 10,055,702 B2
(45) Date of Patent: Aug. 21, 2018

(54) FACILITATING DYNAMIC COLLECTION OF DATA AND GENERATION OF VISUAL WORKFLOW IN AN ON-DEMAND SERVICES ENVIRONMENT

(71) Applicant: salesforce.com, inc., San Francisco, CA (US)

(72) Inventors: Samuel William Bailey, San Francisco, CA (US); Joshua M. Roe, Pacifica, CA (US); Aniko van der Lee, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 614 days.

(21) Appl. No.: 14/478,760

(22) Filed: Sep. 5, 2014

(65) Prior Publication Data

US 2014/0379400 A1 Dec. 25, 2014

Related U.S. Application Data

(63) Continuation-in-part of application No. 14/171,229, filed on Feb. 3, 2014, now abandoned, which is a
(Continued)

(51) Int. Cl.
*G06Q 10/06* (2012.01)

(52) U.S. Cl.
CPC ..... *G06Q 10/063114* (2013.01); *G06Q 10/06* (2013.01); *G06Q 10/0633* (2013.01); *G06Q 10/06316* (2013.01)

(58) Field of Classification Search
CPC ........ G06Q 10/00; G06Q 40/06; G06C 40/06; G06F 17/60
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

"Integration of Workflow and Agent Technology for Business Process Management" Jul. 2001, The Sixth International Conference on CSCW in Design. London, Ontario, Canada, pp. 1-11.
(Continued)

*Primary Examiner* — Romain Jeanty
(74) *Attorney, Agent, or Firm* — Jaffery, Watson, Mendonsa & Hamilton, LLC

(57) ABSTRACT

In accordance with embodiments, there are provided mechanisms and methods for facilitating collection of data and dynamic generating of visual workflow and corresponding tasks in an on-demand services environment. In one embodiment and by way of example, a method includes receiving, by and incorporating into a database system, a query to perform a collection of data relating to an organization, where the query represents creating a new business process relating to workings of the organization. The method may further include collecting, by the database system, the data from one or more accounts relating to the organization, assigning, by the database system, one or more tasks to the collected data, performing, by the database system, the one or more tasks, and dynamically generating, by the database system, a visual workflow in response to the performing of the one or more tasks, wherein the visual workflow is used to facilitate the new business process based on the one or more tasks.

15 Claims, 18 Drawing Sheets

Related U.S. Application Data continuation of application No. 13/310,545, filed on Dec. 2, 2011, now Pat. No. 8,660,881.

(60) Provisional application No. 61/419,791, filed on Dec. 3, 2010.

(58) Field of Classification Search
USPC .................................................. 705/7.15
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,990,632 B2 | 1/2006 | Rothchiller et al. |
| 6,990,636 B2 * | 1/2006 | Beauchamp ........... G06Q 10/10 715/764 |
| 7,289,976 B2 | 10/2007 | Kihneman et al. |
| 7,310,653 B2 | 12/2007 | Coyle et al. |
| 7,340,411 B2 | 3/2008 | Cook |
| 7,620,655 B2 | 11/2009 | Larsson et al. |
| 7,853,472 B2 | 12/2010 | Al-Abdulqader et al. |
| 7,890,452 B2 * | 2/2011 | Moore ................... G06Q 10/10 707/608 |
| 8,243,893 B2 | 8/2012 | Hayes et al. |
| 8,566,125 B1 * | 10/2013 | Perry .................. G06Q 10/103 705/35 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0036934 A1 * | 2/2003 | Ouchi .............. G06Q 10/06311 705/7.13 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0197733 A1 * | 10/2003 | Beauchamp ........... G06Q 10/10 715/764 |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0123010 A1 * | 6/2006 | Landry ............ G06F 17/30557 |
| 2007/0027778 A1 * | 2/2007 | Schellhammer ....... G06Q 10/10 705/26.1 |
| 2007/0244910 A1 * | 10/2007 | Mital .................... G06Q 10/10 |
| 2007/0265895 A1 * | 11/2007 | Moore ................... G06Q 10/06 705/70 |
| 2009/0177744 A1 | 7/2009 | Marlow et al. |

(56) References Cited

U.S. PATENT DOCUMENTS

2009/0299952 A1    12/2009  Zheng et al.
2010/0106546 A1*   4/2010  Sproule ................ G06Q 10/063
                                                               717/103
2011/0087548 A1    4/2011  Schauser et al.

OTHER PUBLICATIONS

Final Office Action for U.S. Appl. No. 13/310,545 dated Aug. 14, 2013, 7 pages.
Final Office Action for U.S. Appl. No. 14/171,229 dated Aug. 28, 2015, 8 pages.
Final Office Action for U.S. Appl. No. 14/171,229 dated Sep. 8, 2016, 12 pages.
Non-Final Office Action for U.S. Appl. No. 13/310,545 dated Mar. 19, 2013, 9 pages.
Non-Final Office Action for U.S. Appl. No. 14/171,229 dated Mar. 11, 2016, 10 pages.
Non-Final Office Action for U.S. Appl. No. 14/171,229 dated Mar. 13, 2015, 12 pages.
Notice of Allowance for U.S. Appl. No. 13/310,545 dated Oct. 11, 2013, 9 pages.

* cited by examiner

FACILITATING DYNAMIC COLLECTION OF DATA AND GENERATION OF VISUAL WORKFLOW IN AN ON-DEMAND SERVICES ENVIRONMENT

CLAIM OF PRIORITY

This application is a continuation-in-part of U.S. patent application Ser. No. 14/171,229, entitled "MECHANISM FOR FACILITATING DYNAMIC VISUAL WORKFLOW AND TASK GENERATION IN AN ON-DEMAND SERVICES ENVIRONMENT" by Stephen Wood, et al., filed Feb. 3, 2014, which is a continuation of U.S. patent application Ser. No. 13/310,545, entitled "MECHANISM FOR FACILITATING DYNAMIC VISUAL WORKFLOW AND TASK GENERATION IN AN ON-DEMAND SERVICES ENVIRONMENT" by Stephen Wood, et al., filed Dec. 2, 2011, now U.S. Pat. No. 8,660,881, which claims the benefit of and priority to U.S. Provisional Patent Application No. 61/419,791, entitled "A VISUAL FLOW DESIGNER" by Steven Wood, et al., filed Dec. 3, 2010, the benefit of and priority to all are claimed thereof and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic collection of data and generation of visual workflow in an on-demand services environment having a multi-tenant database system.

BACKGROUND

It is well-known that businesses (e.g., profit-based companies, non-profit organizations, etc.) continuously need new or updated business processes (e.g., service processes, sales processes, etc.) to run and perform efficiently. However, conventionally, business processes are employed and/or updated manually which requires cumbersome new coding or software development each time a new business process is employed or a change is made to an existing business process at an organization. Further, in most cases, an expensive and dedicated environment or infrastructure may also be needed to employ new or update existing business processes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

SUMMARY

In accordance with embodiments, there are provided mechanisms and methods for facilitating collection of data and dynamic generating of visual workflow and corresponding tasks in an on-demand services environment. In one embodiment and by way of example, a method includes receiving, by and incorporating into a database system, a query to perform a collection of data relating to an organization, where the query represents creating a new business process relating to workings of the organization. The method may further include collecting, by the database system, the data from one or more accounts relating to the organization, assigning, by the database system, one or more tasks to the collected data, performing, by the database system, the one or more tasks, and dynamically generating, by the database system, a visual workflow in response to the performing of the one or more tasks, wherein the visual workflow is used to facilitate the new business process based on the one or more tasks.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Methods and systems are provided for facilitating dynamic generating of visual workflow and corresponding tasks in an on-demand services environment. In one embodiment and by way of example, a method includes receiving, by and incorporating into a database system, a query to perform a collection of data relating to an organization, where the query represents creating a new business process relating to workings of the organization. The method may further include collecting, by the database system, the data from one or more accounts relating to the organization, assigning, by the database system, one or more tasks to the collected data, performing, by the database system, the one or more tasks, and dynamically generating, by the database system, a visual workflow in response to the performing of the one or more tasks, wherein the visual workflow is used to facilitate the new business process based on the one or more tasks.

In one embodiment and by way of example, a method includes receiving, at a computing device, a query to perform a collection of data relating to an organization, where the query represents creating a new business process relating to workings of the organization. The method may further include collecting the data from one or more accounts relating to the organization, assigning one or more tasks to the collected data, performing the one or more tasks, and dynamically generating a visual workflow in response to the performing of the one or more tasks, wherein the visual workflow is used to facilitate the new business process based on the one or more tasks.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for dynamic visual flow and task generation in an on-demand service environment having a multi-tenant database system will be described with reference to example embodiments.

Figure 1:
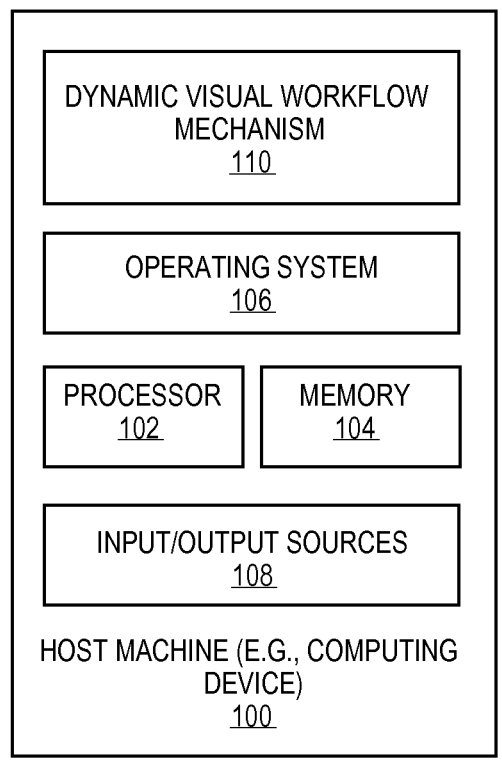
FIG. 1 illustrates a computing system employing a dynamic workflow mechanism according to one embodiment.

FIG. 1 illustrates a computing system employing a dynamic visual workflow mechanism according to one embodiment of the invention. In one embodiment, a computing device 100 serves as a host machine hosting a dynamic visual workflow mechanism ("workflow mechanism") 110 to facilitate dynamic, customized, and efficient generation of visual workflows and their corresponding tasks relating to business processes at an organization without having to require a new code/software and/or a dedicated environment/infrastructure. Computing device 100 serving as a host machine may include large computing devices, such as server computers, desktop computers, cluster-based computers, laptop computing devices (e.g., notebooks, netbooks, etc.), set-top boxes (e.g., Internet-based cable television set-top boxes, etc.), and the like. Computing device 100 and other computing devices (serving as client computing devices) discussed in this document may also include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers, e-readers (e.g., Kindle®, Nook®, etc.), etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output sources 108, such as touchscreens, touch panels, touch pads, virtual or regular keyboards, virtual or regular mice, etc. It is to be noted that terms like "node", "computing node", "client", "server", "machine", "host machine", "device", "computing device", "computer", "computing system", "multi-tenant on-demand data system", and the like, are used interchangeably and synonymously throughout this document. It is to be further noted that terms like "application", "software application", "program", "software program", "package", and "software package" are used interchangeably and synonymously throughout this document.

Figure 2:
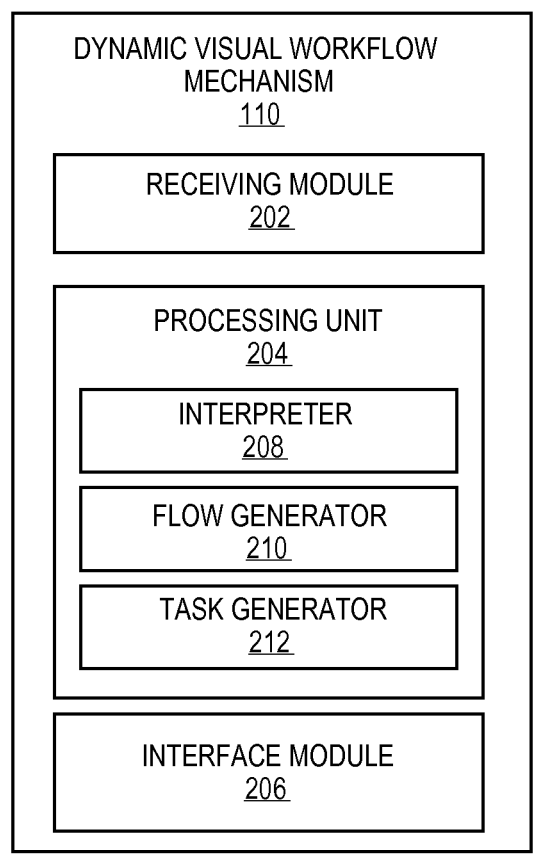
FIG. 2 illustrates a dynamic visual workflow mechanism employed at a computing device according to one embodiment.

FIG. 2 illustrates a dynamic visual workflow mechanism employed at a computing device according to one embodiment. In one embodiment, dynamic visual workflow mechanism 110 includes various components 202, 204, 206, 208, 210 and 212 to offer a number of services to facilitate dynamic, customized, and efficient generation of visual workflow and their tasks relating to business processes of an organization in a multi-tenant database system in an on-demand services environment. Any reference to "organization" or "business" suggests a vendor subscribing to the workflow mechanism 110, such as a profit-based company (e.g., an insurance company, a healthcare company, a banking or financial institute, a grocery store, a law firm, an accounting firm, a small business, etc.), an educational institution (e.g., a college or university, a high school, an elementary school, a daycare center, etc.), a government organization (e.g., a city government, a state and federal government, etc.), a non-profit organization (e.g., a non-government organization (NGO), etc.), and the like. It is contemplated that words or terms like "business", "vendor", "institution", "organization", and "business organization" are used interchangeably and synonymously throughout this document. A "business process" refers to any number and type of business-related activities including sales processes, service processes, human resource processes, etc., that an organization employs to work efficiently and profitably. For example, a business process may include adding a new employee, placing sales calls to potential customers, employing a new sales methodology, establishing new promotional interest rates, and the like.

Workflow mechanism 110 provides efficient solutions to various problems (e.g., inefficiency, high cost, manual coding, etc.) associated with conventional business process-related techniques. In one embodiment, the workflow mechanism 110 empowers the user (e.g., an employee (such as a salesperson, an accountant, a human resource manager, a Central Financial Officer (CFO), a system administrator, an attorney, etc.), a contractor, an intern, a visitor, a volunteer, etc.) at the vendor- or client-side to facilitate employing a new or updating an existing business process (e.g., introducing new insurance rates, etc.) by simply facilitating dynamic generation and/or amendment of visual workflows and their corresponding business tasks relating to business processes at an organization.

In one embodiment, the workflow mechanism 110 may be employed at a host or server computing system (such as host machine 100 of FIG. 1) that is in communication, over a network, with any number and type of client computing systems employed at various organizations. As will be further described in this document, the network may include a cloud computing network, an intranet, the Internet, a Local Area Network (LAN), a Wide Area Network (WAN), a Metropolitan Area Network (MAN), a Personal Area Network (PAN), or the like.

In one embodiment, a receiving module 202 of the workflow mechanism 110 at the host machine receives an indication of or a request for generating or updating a visual workflow relating to a business task by a user accessing an organization-based client computing device. Once this request is received, it is then sent to a processing unit 204 of the workflow mechanism 110. At the processing unit 204, an interpreter 208 interprets the request by reading and analyzing the request to determine the type of flow that is to be generated. For example, to distinguish between those potential customers of the organization who wish to be called back by someone at the organization as opposed to those who do not wish to be contacted, the interpreter 208 may recommend including a decision block within the visual workflow to help determine a potential customer's wish regarding getting a call back. This recommendation is provided to a flow generator 210 which then dynamically add the decision block and other relevant or resulting blocks (e.g., a true block, a false block, an if yes block, an if not block, etc.) to the visual workflow.

In one embodiment, as the visual workflow is dynamically generated, any corresponding tasks are automatically generated by a task generator 212 and conveniently placed within the system so they can be made available to the user to use and manipulate via a user interface. For example and in one embodiment, an interface module 206 may provide a user-friendly user interface (e.g., a Graphical User Interface (GUI)-based user interface, etc.) on an organization-based client computing device so that the user may perform the aforementioned processes of generating and/or amending visual workflows using the workflow mechanism 110 employed at the host machine. In one embodiment, the visual workflow and its corresponding tasks relating to various business processes are dynamically and automatically generated by the user at the organization using the workflow mechanism 110 without having to develop software code and/or employ a dedicated software development environment to generate, amend and/or perform such business processes. This will be further illustrated and described with reference to FIGS. 3A-3I.

It is contemplated that any number and type of components may be added to and removed from the workflow mechanism 110 to facilitate its workings and operability in facilitating dynamic generation and amendment of visual workflows and their corresponding tasks relating to business processes within an organization in a multi-tenant database system in an on-demand services environment. For brevity, clarity, ease of understanding and to focus on the workflow mechanism 110, many of the conventional or known components, such as those of a computing device, are not shown or discussed here.

Figure 3A:
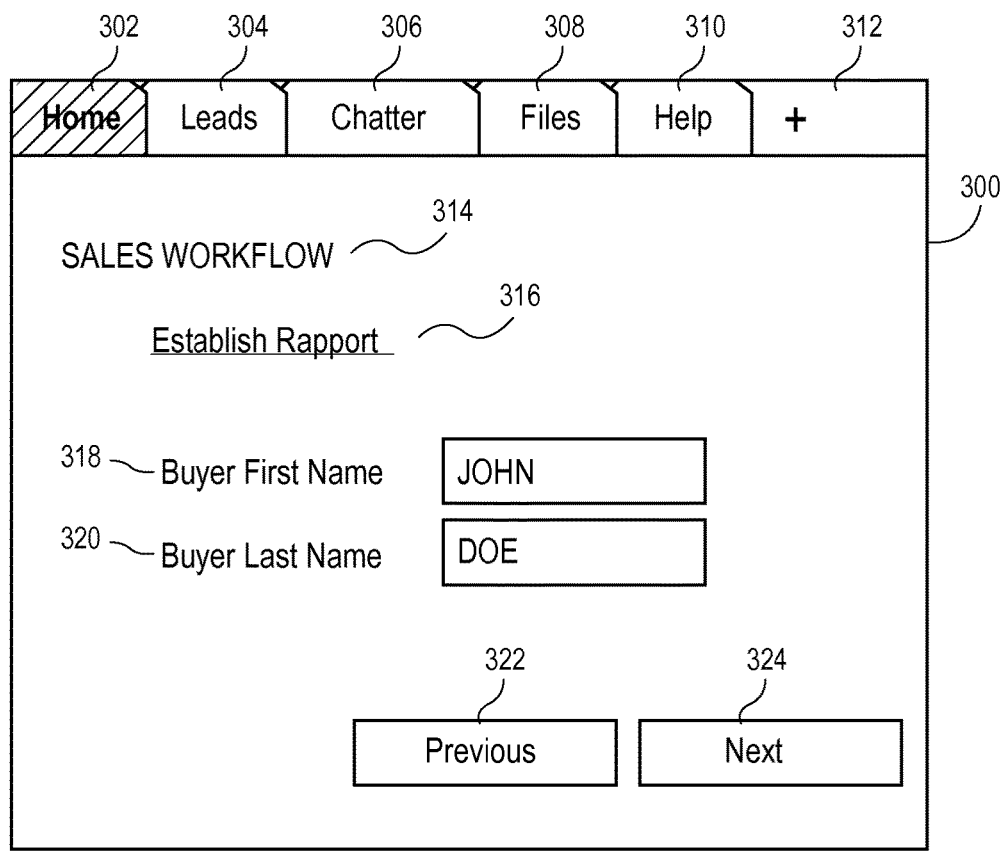
FIGS. 3A-3F and 3H illustrate a transaction sequence for dynamically and automatically generating a visual workflow and its corresponding task using a visual workflow mechanism according to one embodiment.

FIGS. 3A-3F illustrate a transaction sequence for dynamically and automatically generating a visual workflow and its corresponding task using a visual workflow mechanism according to one embodiment. FIG. 3A illustrate a screenshot 300 representing a user interface providing a main menu to generate a sales workflow 314. For example, a user (e.g., a sales agent) at a business organization that is, for example, in the business of arranging with various associate service providers to provide their services (e.g., plumbing services, accounting services, telecommunications services, legal services, dental/medical services, etc.) to its customers can access the aforementioned dynamic visual workflow mechanism 110 of FIG. 1 via a user interface as illustrated by the screenshot 300. For example, the user begins the sales workflow 314, as provided by a home option 302 (shown as a tab), to find and/or contact potential customers that might be interested in seeking one or more services provided by the associate service providers of the business organization. Other options include, but are not limited to, leads 304, chatter 306, files 308, help 310, and miscellaneous 312, and the like. It is contemplated that embodiments of the invention are not limited to any of the features, options or processes, etc., illustrated here as part of FIG. 3A or subsequently described with reference to FIGS. 3B-3I and that any number of options, features, and processes can be added, removed or changed, as necessitated or desired, for facilitating dynamic and automatic generation of visual workflows and their corresponding tasks to perform the relevant business processes.

Figure 3B:
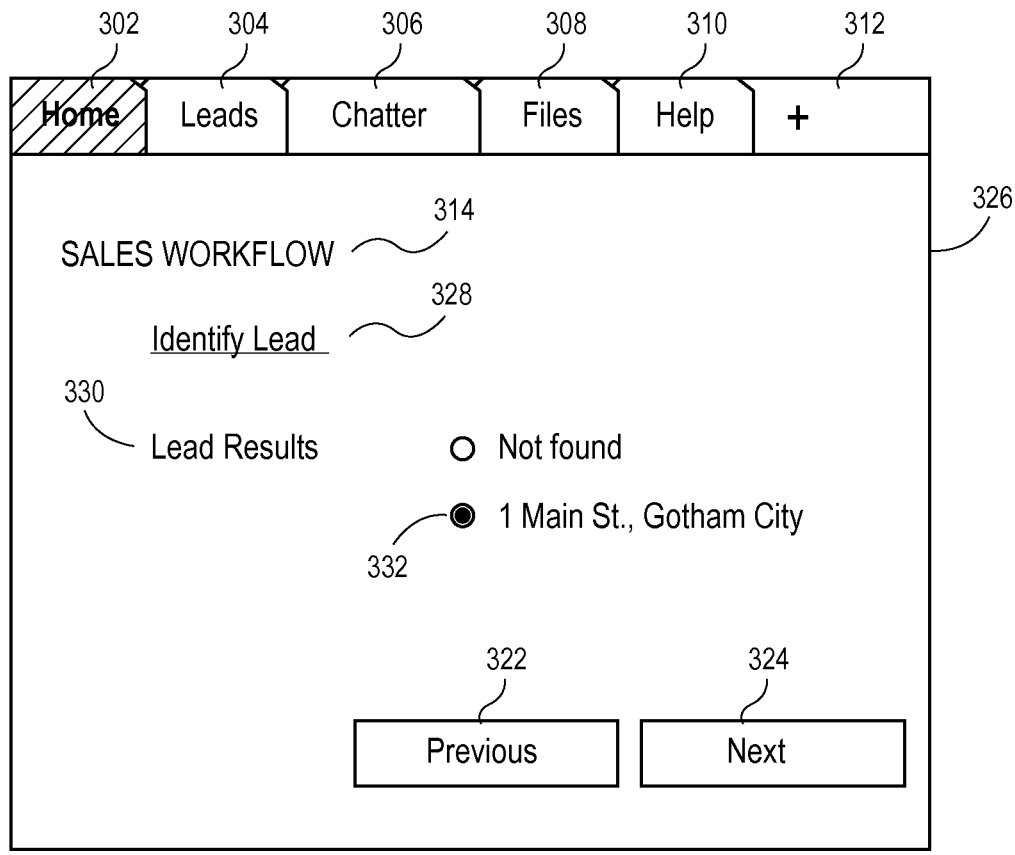

Continuing with FIG. 3A, once the generation of the sales workflow 314 is started, the user is given the option of establishing rapport 316 by inserting the first and last names 318, 320 of a potential customer. The screenshot 300 further provides a navigation option of moving between previous and next screens 322, 324. Once the user has entered the necessary information and clicks on next 324, the user is taken to the next screen 326 to identify lead 328 in the visual workflow as shown by FIG. 3B. For brevity and simplicity, the repeated features of FIG. 3A are not discussed here or in relation to the subsequent FIGS. 3C-3I. The identify lead process 328 of the sales workflow provides lead results 330 based on the first and last names 318, 320 previously entered. For example, the user may be provided the option of the potential customer not found or found. If found, some identification information (e.g., home address, etc.) 332 relating to the potential customer existing in the system or database may be shown. For example, here, the home address 332 of the potential customer is identified and selected by the user. Again, next 324 is clicked to move on to the next process, such as industry interest 336 as shown by screenshot 334 of FIG. 3C.

Figure 3C:
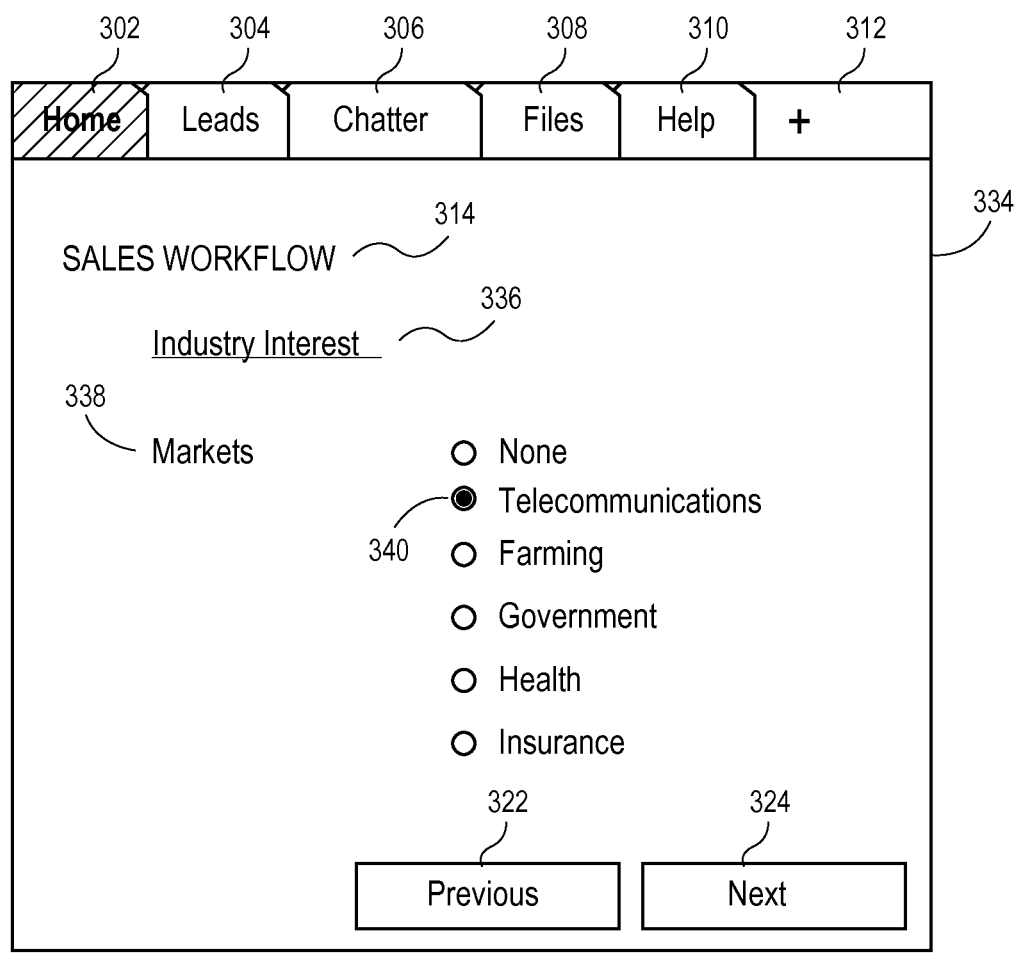

As illustrated in FIG. 3C, the industry interest process 336 of the sales workflow 314 provides the user a number of service market options 338 that might be of interest to the potential customer. Such market options 338 may range from none to any number of service-based options, such as telecommunications 340, farming, government, health, insurance, etc. With regard to this example, since our exemplary business organization is in the business of working with its associate service providers to provide services, let us say the potential customer is interested in receiving telecommunications-related services and so the user selects the option of telecommunications 340 and clicks next 324.

Figure 3D:
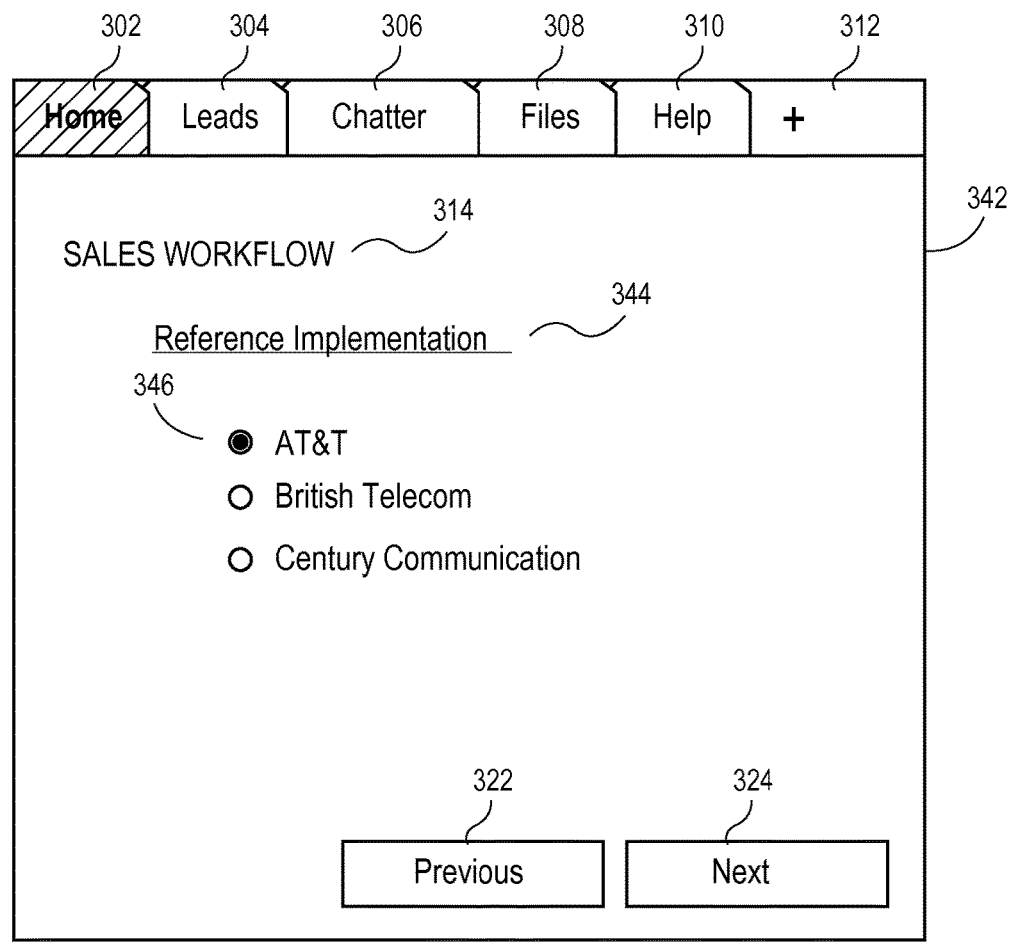

Once the telecommunications 340 is selected, the virtual workflow for sales 314 continues with options provided through the reference implementation process 344 via a screenshot 342 as shown with reference to FIG. 3D. In other words and for example, the sales workflow 314 automatically provides a number of recommendations or references, such as various names of companies (e.g., AT&T 346, British Telecom, Century Communications, etc.), relating to services relating to telecommunications 340 based, for example, on past experiences of other customers of the business organization. Further, based on the potential customer's service preferences, geographic location, budget, etc., one of the recommendations, such as AT&T 346, is selected and subsequently, next 324 is chosen.

Figure 3E:
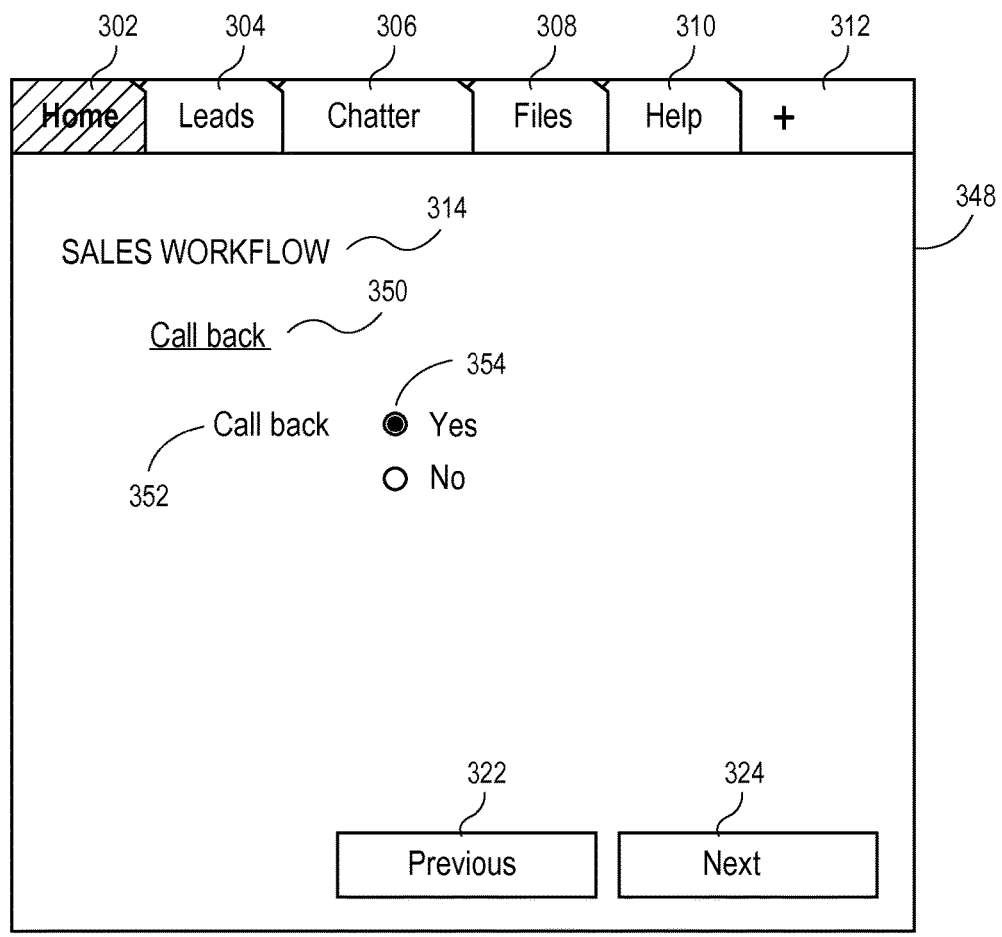

Now referring to FIG. 3E, another screenshot 348 is illustrated. This screenshot 348 provides the call back option 350. For example, the salesperson may ask the potential customer whether they would like to be called back by someone at the business organization. Based on the potential customer's response, one of the two or more callback options 352 (e.g., yes 354 and no) of the callback option 350 may be selected by the user. Continuing with our example, in this case, the user selects the yes option 354 because the potential customer expressed interesting in being called back. Then, next 324 is selected, which leads to the next screenshot 356 of FIG. 3F providing the thanks option 358 so that the potential customer may be thanked by the user (regardless of whether the potential customer agreed upon being called back). Subsequently, the user may choose the finish option 360 to end the sales visual workflow 314.

Figure 3F:
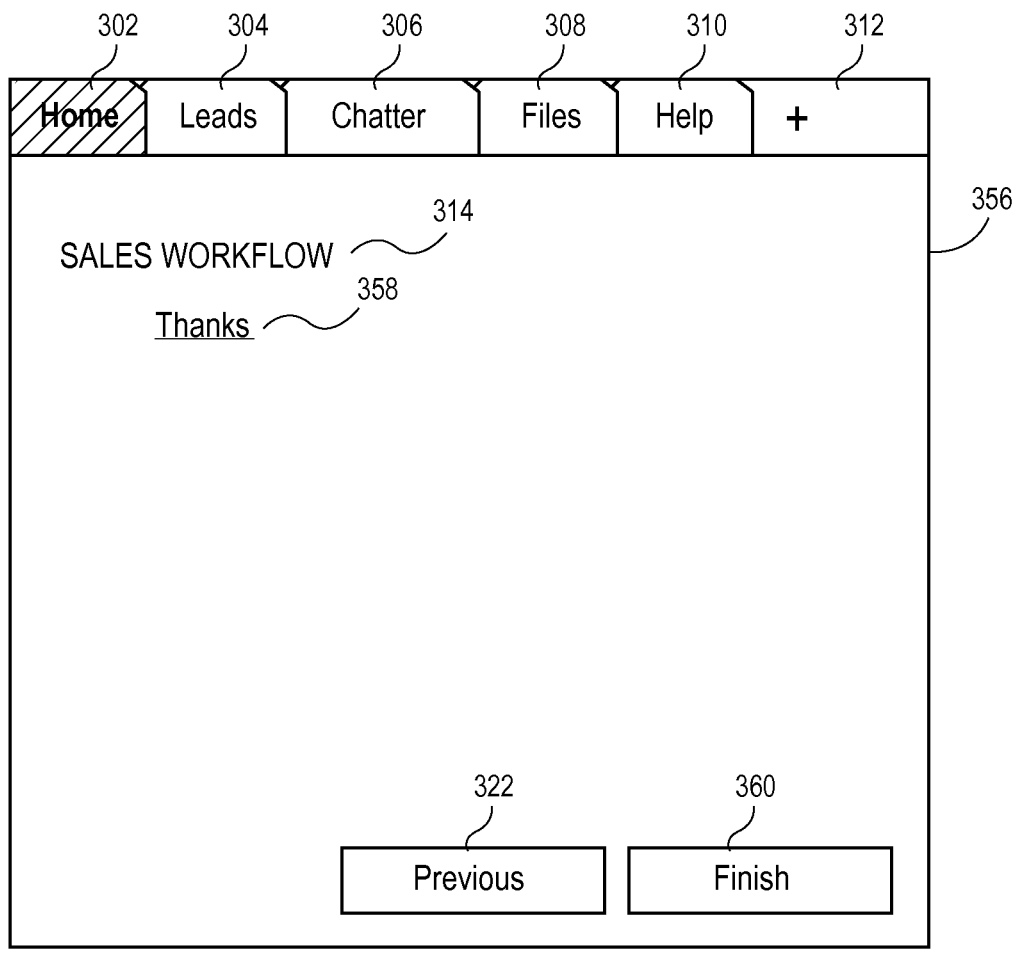
Figure 3G:
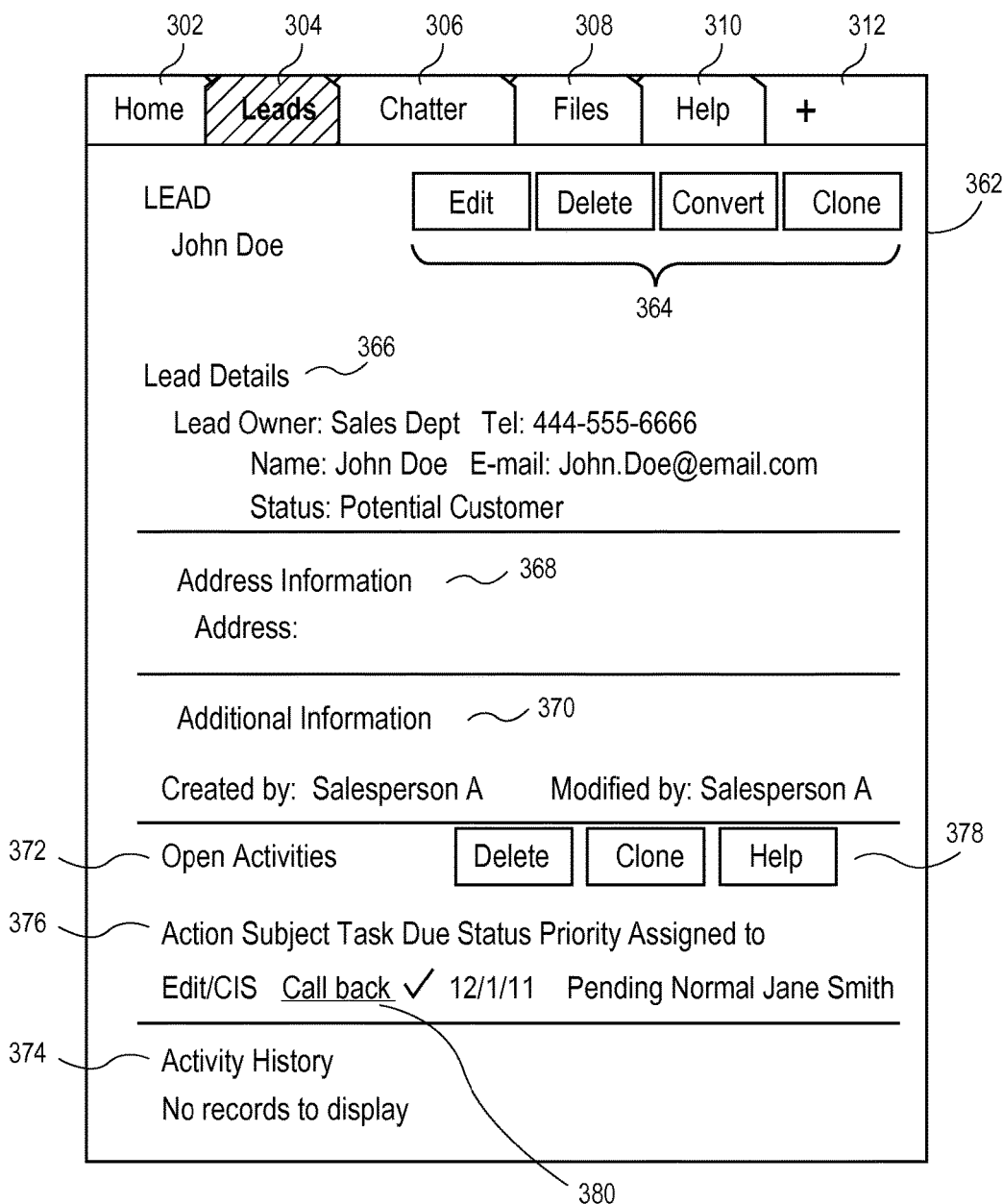
FIG. 3G illustrates a task that is dynamically automatically generated based on the visual workflow of FIGS. 3A-3F according to one embodiment.
Figure 3H:
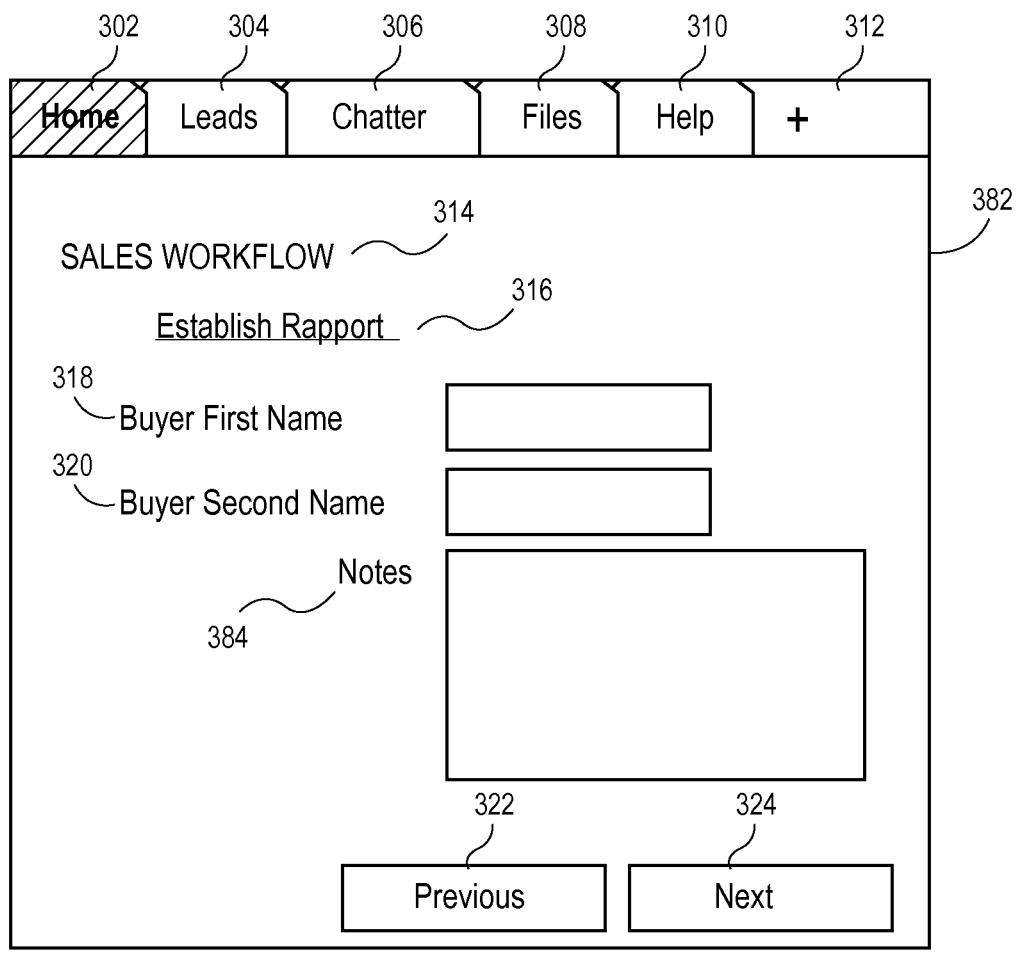
Figure 3I:
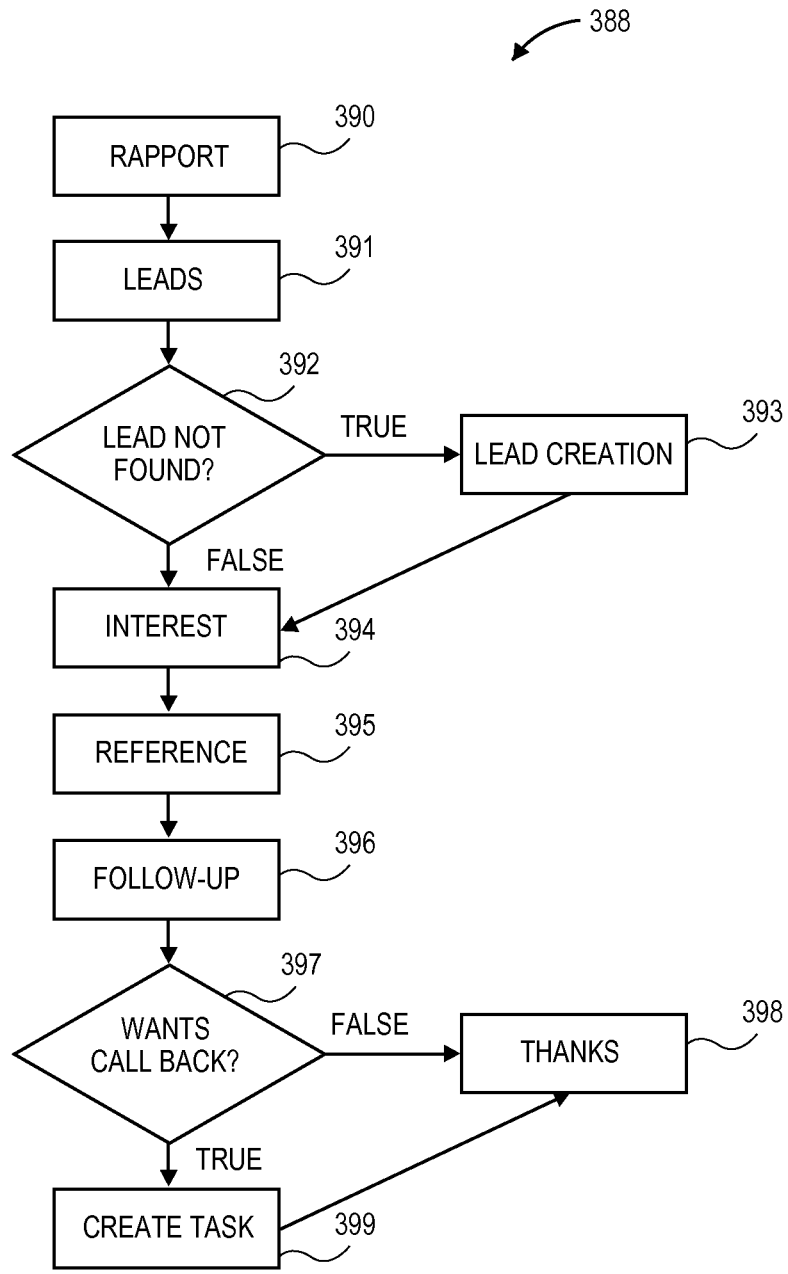
FIG. 3I illustrates an interactive visual workflow that is dynamically automatically generated based on the visual workflow of FIGS. 3A-3F according to one embodiment.

FIGS. 3G and 3I illustrate a corresponding task and a sales visual workflow, respectively, which are dynamically and automatically generated in response to performance of the transaction sequence by the user using the workflow mechanism as shown with reference to FIGS. 3A-3F. In one embodiment, by simply going through the transaction sequence of FIGS. 3A-3F relating to a particular business process (used as an example here) of contacting a potential customer, a corresponding task (as summarized by open activities 372 of screenshot 362) and a flowchart-based sales visual workflow 388 (corresponding to the transaction sequence-based sales visual workflow 314) are dynamically and automatically generated without having the need to perform software development (e.g., generating code relating to the specific business process) or employ and maintain a dedicated software development environment or infrastructure.

Now referring to FIG. 3G, it illustrates a screenshot 362 based on the leads option 304 of the main menu. The potential client (also referred to as "lead"), as shown here, is John Doe, as identified in FIG. 3A. It is further illustrated that a number of options 364 (e.g., edit, delete, convert, clone, etc.) regarding the lead or the account relating to the lead may be provided to facilitate various actions. The screenshot 362 further provides lead details 366, such as the lead owner (e.g., sales department), status of the lead (e.g., potential customer), etc., along with other relevant information, such as the lead's address information 368, and any other additional information 370 (e.g., who created or modified the lead, when was the lead created or modified, etc.) relating to the lead account.

In one embodiment, continuing with the example as set forth with reference to the transaction sequence of FIGS. 3A-3F, the user's work in creating the sales visual workflow 314 is summarized and provided as a task as set forth in the open activities section 372 of the lead screenshot 362. For example, the open activities section 372 provides various information- and action-based options 376, 378 to be used with regard to the task of calling back 380 the customer as agreed upon by the potential customer with reference to FIG. 3E. Some of these options 376, 378 include immediate actions, such as edit, close, delete, clone, help, etc., relating to the task, status about the task (e.g., as shown by the checkmark and/or the word pending), a deadline or due date (e.g., Dec. 1, 2011) by which the task is to be performed, a priority (e.g., normal, high, etc.) assigned to the task, the name of the person (e.g., Jane Smith) who is assigned to take care of the task, and the like. Similarly, an activity history 374 relating to past activities relating to the potential customer may be provided for the user's reference.

Now referring to FIG. 3I, it illustrates the interactive flowchart-based sales visual workflow 388 that is automatically and dynamically generated by the user's transaction sequence of FIGS. 3A-3F relating the business process of sales (more specifically, contacting and bringing on-board a potential customer). The transaction sequence as illustrated by the sales workflow 388 begins by establishing rapport at block 390 corresponding to FIG. 3A followed by identifying lead at block 391 corresponding to FIG. 3B. At decision block 392, corresponding to FIG. 3B, a determination is made as to whether the potential client or lead exists in the system. If the potential client does not exist, the lead is created at block 393; otherwise, the process moves on to selecting an (industry) interest at block 394 as shown with reference to FIG. 3C. Continuing with the process, a reference is selected at block 395 as shown in FIG. 3D and a follow-up is determined at block 396 as shown in FIG. 3E. Corresponding to FIG. 3E, at decision block 397 a determination is made as to whether the user has agreed upon a call back by the business organization. If yes, the task is automatically created at block 399 (and as shown in detail with reference to FIG. 3G) and subsequently, the potential customer is thanked (even if the potential customer disagrees with the call back option) at block 398 as shown in FIG. 3F.

In one embodiment, the sales visual workflow 388 is interactive, such as the user may click on any of the blocks of the visual workflow 388 to selectively add, delete, or amend any information relating to the potential customer or any number and type of the transaction sequence options of FIGS. 3A-3F that can be used in generating the visual workflow 388 and the corresponding task of FIG. 3G. For example, the user may click on block 390 representing establishing rapport to add, for example, a box to provide extra space for notes 384 as shown with reference to the screenshot 382 of FIG. 3H. As illustrated and compared with FIG. 3A, here, the user may add an extra notes box 384 by simply, interactively, clicking on block 390 of the visual workflow 388. Similarly, in one embodiment, the user may interactively click on any of the blocks of the visual workflow 388 to make any changes to various transaction sequence options to create or amend any number and type of business processes, as desired or necessitated, without having to generate software code or employ a dedicated software environment.

Figure 4:
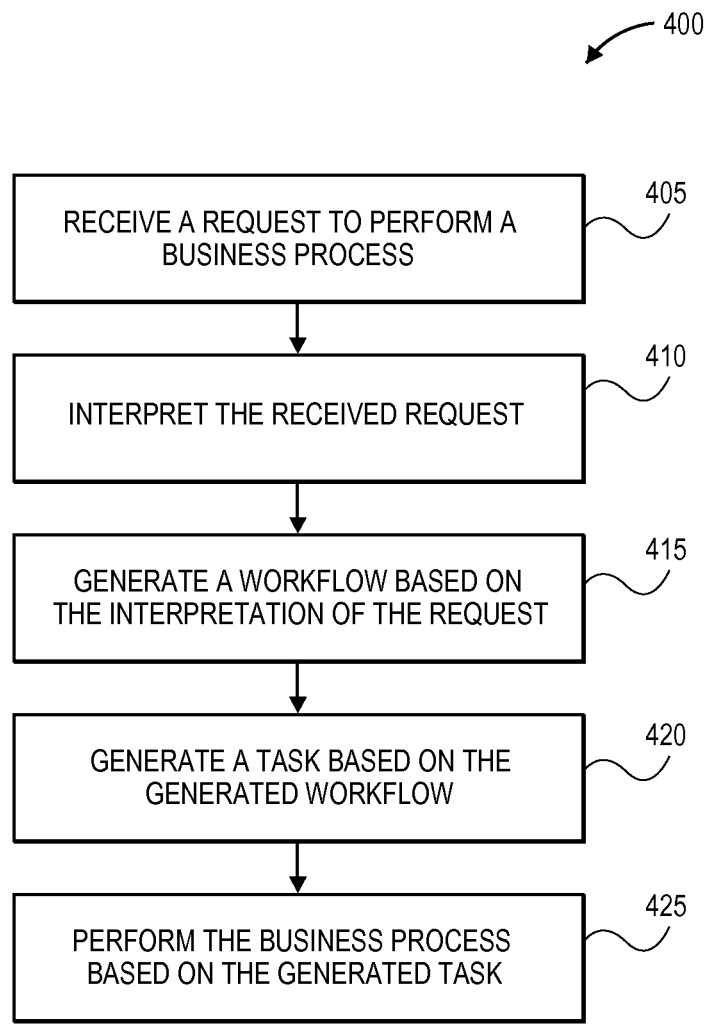
FIG. 4 illustrates a method for dynamically and automatically generating visual workflows and their corresponding tasks using a dynamic visual workflow mechanism according to one embodiment.

FIG. 4 illustrates a method for dynamically and automatically generating visual workflows and their corresponding tasks using a dynamic visual workflow mechanism according to one embodiment. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by the dynamic visual workflow mechanism 110 of FIG. 1.

Method 400 begins at block 405 with the workflow mechanism, at a host or server computing system, receiving a request to perform a business process at a client computing system. In one embodiment, the workflow mechanism may receive either a request from the user or simply identify or detect the initiation of a process to generate a visual workflow to perform the business process (including, for example, generate or amend the business process, etc.). At block 410, once the request is received or the process is detected, it is then interpreted and a corresponding recommendation is generated. At block 415, a corresponding visual workflow is generated based on the interpretation of or recommendation generated relating to the request. At block 420, a corresponding task relating to the business process is generated based on the visual workflow. At block 425, the newly-generated task and workflow are used to perform the business process.

Figure 5:
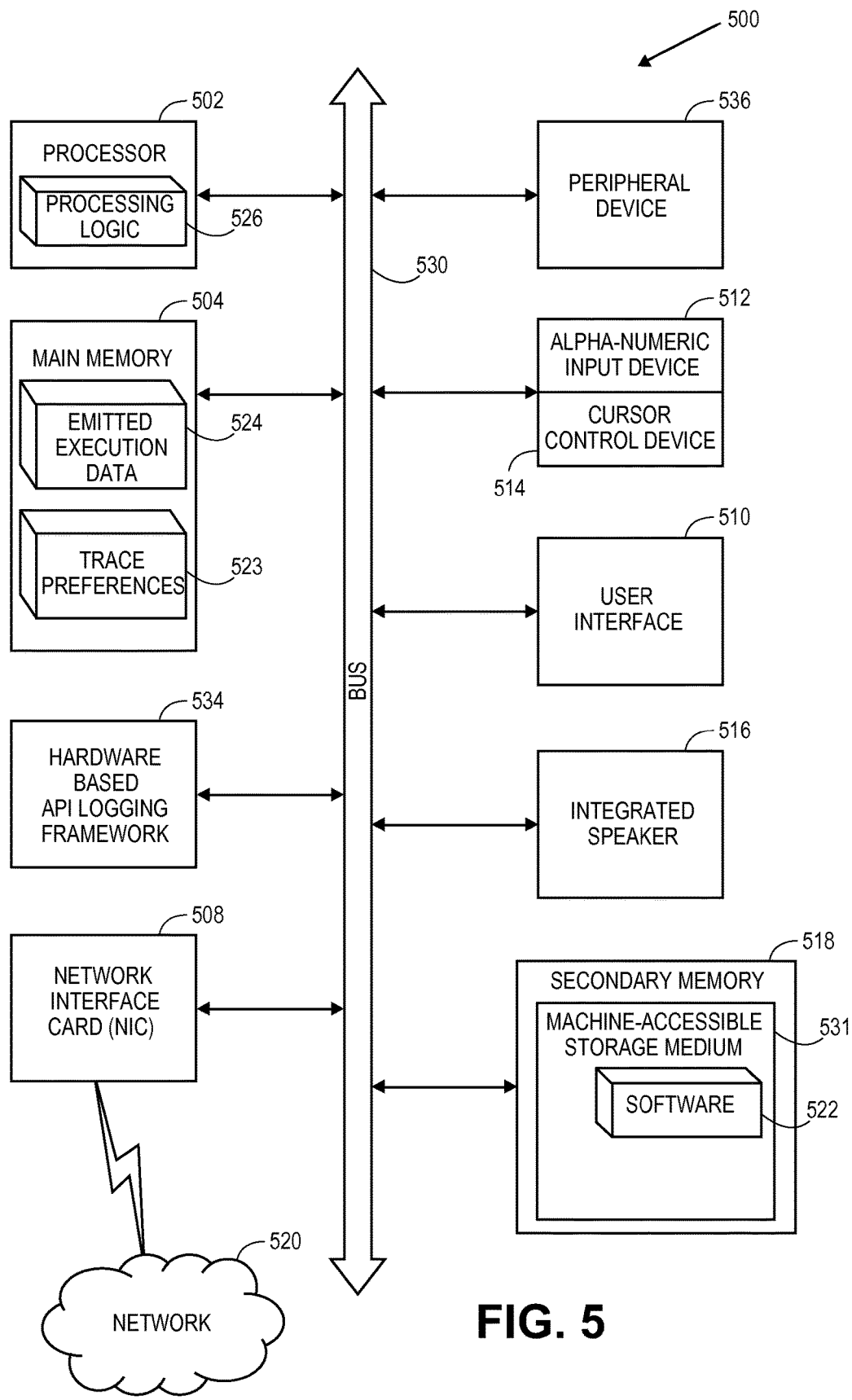
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 of FIG. 1. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic visual workflow mechanism 110 as described with reference to FIGS. 1 and 2 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic visual workflow mechanism 110 as described with reference to FIGS. 1 and 2 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Figure 6:
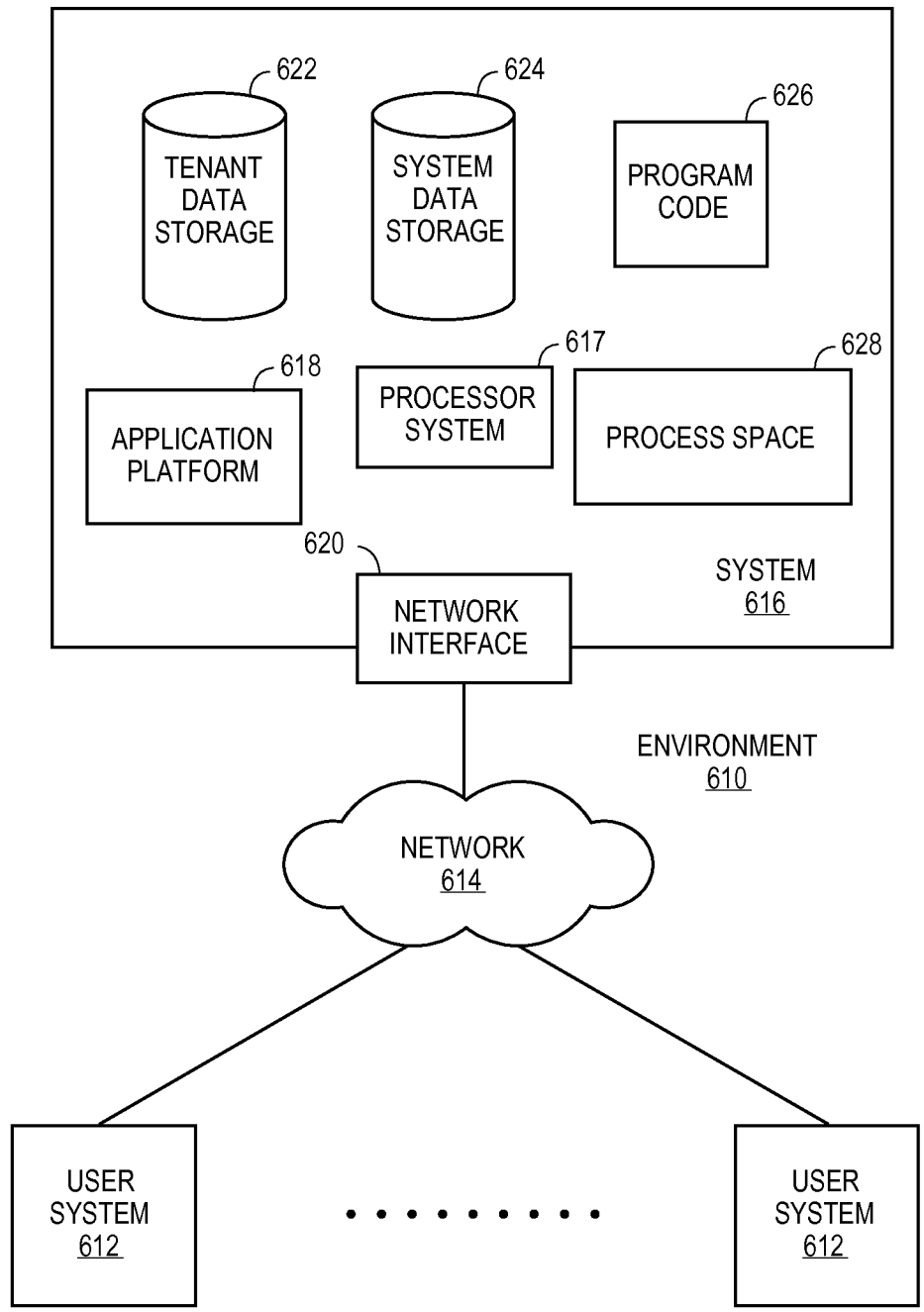
FIG. 6 illustrates a block diagram of an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server"

are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
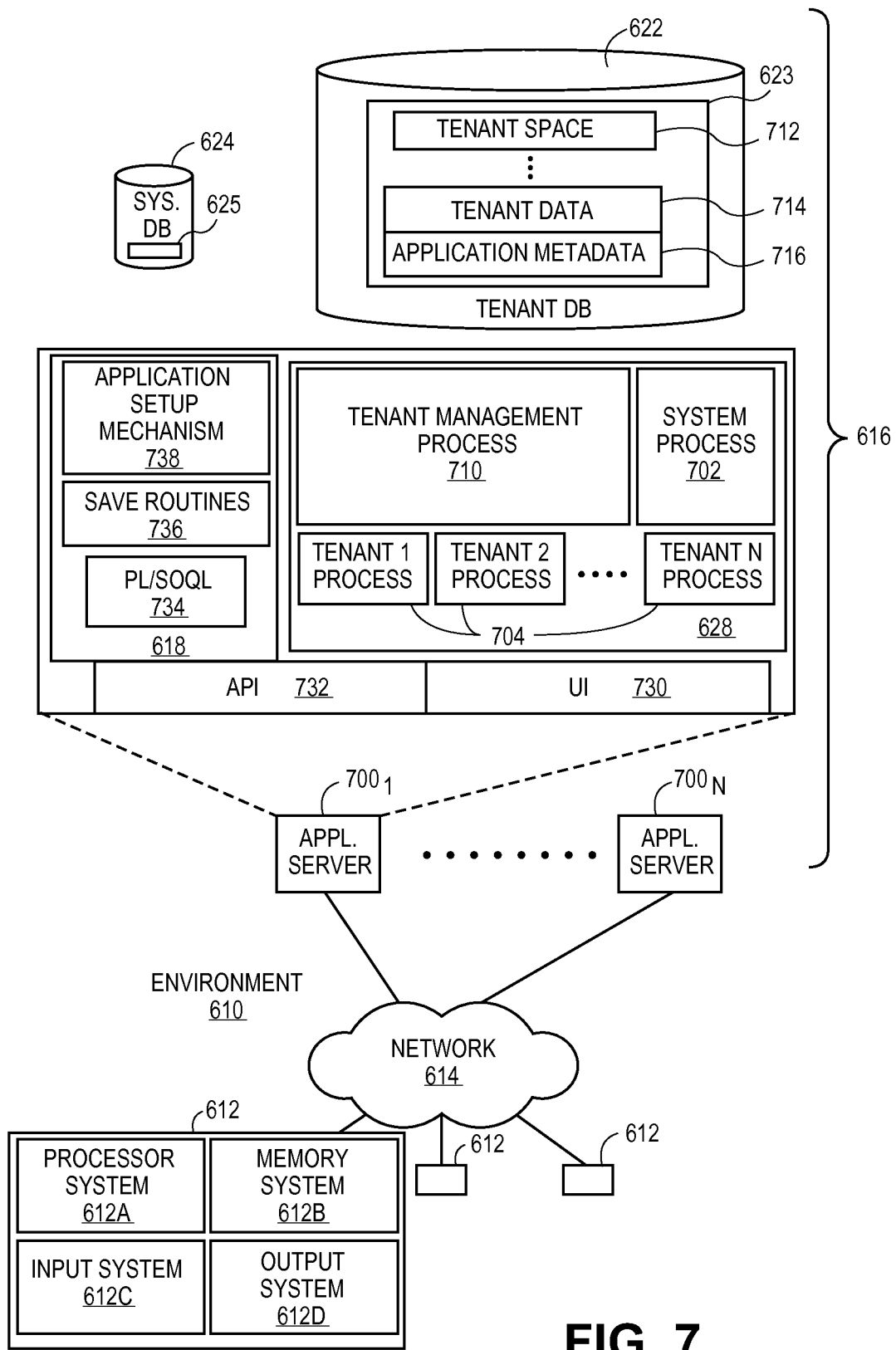
FIG. 7 illustrates a block diagram of an embodiment of elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8:
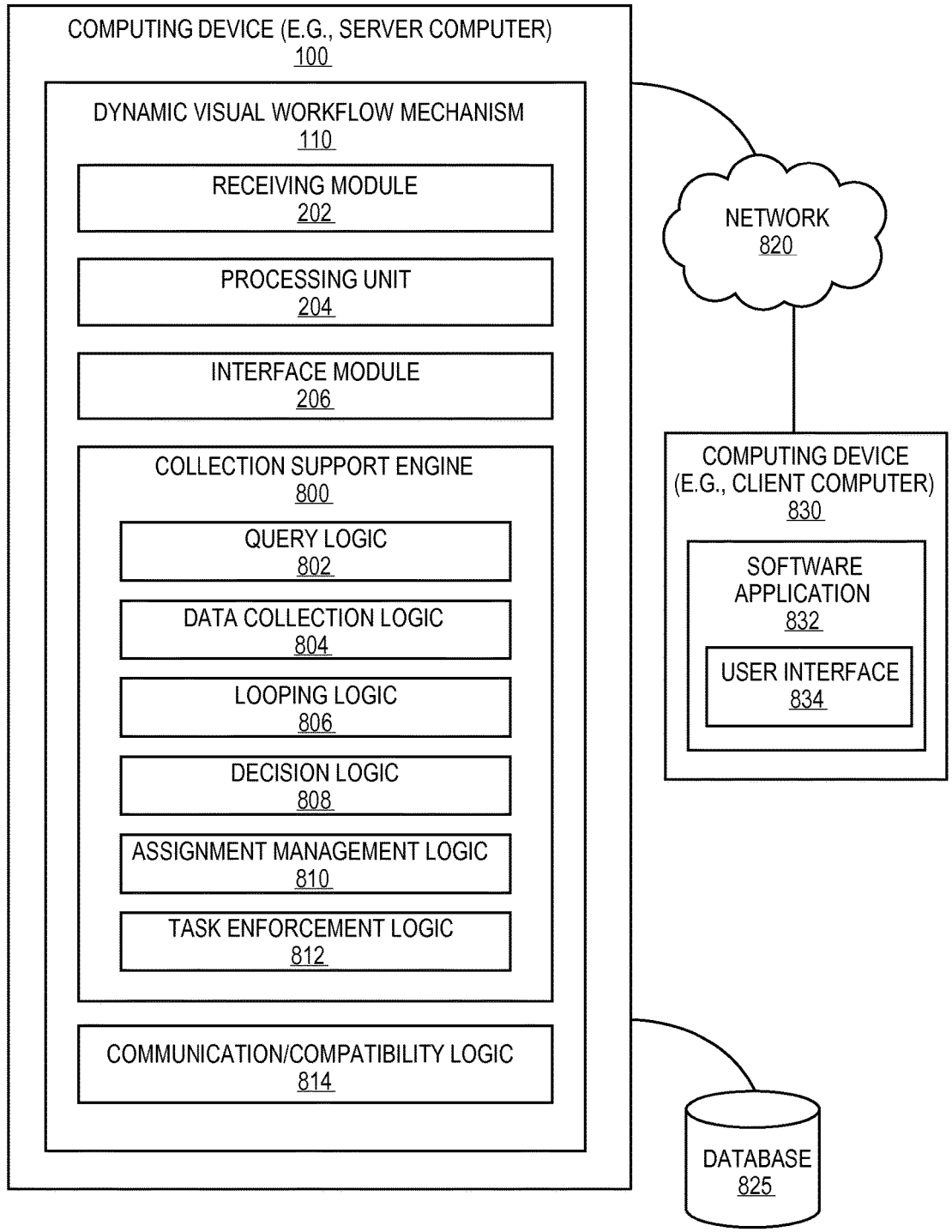
FIG. 8 illustrates a dynamic visual workflow mechanism of FIG. 2 having a collection support engine according to one embodiment.

FIG. 8 illustrates a dynamic visual workflow mechanism 110 of FIG. 2 having a collection support engine 800 according to one embodiment. As an initial matter, for brevity, various details relating to workflow mechanism 110 as previously discussed with reference to the preceding figures, such as FIGS. 1, 2 and 4, may not be repeated or discussed hereafter. In one embodiment, workflow mechanism 110 may include collection support engine 800 having a number of components, such as (without limitation): query logic 802, data collection logic 804, looping logic 806, decision logic 808, assignment management logic 810, and task enforcement logic 812. Workflow mechanism 110 may further include communication/compatibility logic 814.

For example, via collection support engine 800, embodiments provide for facilitating collections of data or values to be retrieved from one or more databases, such as database 225, to then be manipulated as requested by a user such that various user-requested tasks may be efficiently performed via a visual workflow as provided by workflow mechanism 110 and further described with reference to FIG. 2. Further, for example, in some embodiments, a single query placed by a user may be needed and used to perform multiple and various types of tasks using a looping or iteration mechanism, as facilitated by looping logic 806, without having to have the user place multiple queries to perform multiple tasks.

In one embodiment, workflow mechanism 110 may be employed by a host machine, such as computing device 100, serving as a server computer and in communication with one or more databases, such as database 825, one or more computing devices, such as computing device 830, serving as a client computer, over one or more networks, such as network 820 (e.g., cloud network, Internet, etc.). In one embodiment, computing device 830 may host one or more software applications, such as software application 832, providing one or more user interfaces, such as user interface 834, to, for example, allow the user to communicate with workflow mechanism 110 by placing a query and communicating the query over network 820.

Throughout this document, "logic", "component", "module", "framework", and "engine" may be referenced interchangeably and include, by way of example, software, hardware, and/or any combination of software and hardware, such as firmware. Further, any use of a particular brand, word, or term, such as "collection", "workflow", "number variable", "decision element", "assignment element", "looping", "iteration", "nested looping", etc., should not be read to limit embodiments to software or devices that carry that label in products or in literature external to this document.

In one embodiment and for example, a user having access to computing device 830 may choose to place a query via user interface 834 of software application 832 at computing device 830. The query may then be communicated to workflow mechanism 110 over network 820. For example, in the query, the user may request any amount and type of data (e.g., numbers, data, strings) from any number and type of accounts relating to an organization associated with the user, such as (without limitations): the user may request each salesperson's second quarter ("Q2") sales numbers to be emailed to the management committee; names and other information relating to new employees such that the names and other information may be saved and printed to then be reviewed by the user; names of individuals and their titles representing management and non-management positions so that special privileges may be given to or taken away from or maintained for any number of the individuals, etc. It is contemplated that a query may be as simple as including a request for collecting a single piece of data (such as name, zip code, etc.) and performing a simple task (e.g., email, delete, share, print, save, etc.) without any need for loops or iterations, etc., and where the query may be as complicated as having nested loops, such as loops within loops, etc., for collection of data and assigning and applying complex computations or tasks to the collected data, etc.

Continuing with the above example, the query placed by the user at computing device 830 may be received by query logic 802 of workflow mechanism 110 at computing device 100 over network 820. Upon receiving the query, query logic 802 may then forward the query to data collection logic 804 to collect the necessary and/or relevant data as requested in the query. Upon receiving the query details from query logic 802, data collection logic 804 may perform collection of the requested data, such as names of salespersons and their sales numbers, names of individual and their titles, etc.

Once the requested data is collected by data collection logic 804, depending on the nature of the rest of the request as set for the in the user query, the requested data may be forwarded on to one of looping logic 806, decision logic 808, and assignment management logic 810. For example, if the user query simply requests all names of salespersons and their sales numbers that are to be emailed to upper management for recognition, the collection data may be forwarded on to assignment management logic 810 where an email task may be assigned to the collection data which is then enforced (e.g., collected data is emailed to the management) by task enforcement logic 812. However, in one embodiment, if a decision element is included in the query, such as only Q2 sales numbers or only the salespersons responsible for sales of over $25,000 in sales, new employees only, etc., then the collection data may be forwarded on to decision logic 808 for processing the collected data in accordance with the one or more decision elements before the collection data may be forwarded on to assignment management logic 810.

Continuing with the example above, once the collection data is received at decision logic 808, one or more decision or filtering elements (such as Q2 sales data only, salespersons with sales over $25,000 based on 2014 data only, a list of new employees only and split into two parts by hired within 1-30 days and 31-90 days, etc.) may be applied to the collection data to intelligently filter the collection data. Once the decision process is completed and the filtered data is obtained, the filtered data may then be sent to assignment management logic 810 to appropriately apply any assignments to the filtered data. For example, one or more assignment elements may be included in the query so that one or more corresponding tasks may then be performed by task enforcement logic 812.

In one embodiment, a simple assignment element, such as "email sales numbers to management", "save and print the new employees list", "delete any data relating to terminated receptionists from the database", etc., may be assigned to the filtered data. Upon receiving the assigned filtered data, task enforcement logic 812 may then perform the task corresponding to the assignment element. It is contemplated that in some embodiments, parallel or background queries may be run in order to facilitate execution of certain tasks. For example, if the query requires emailing sales numbers to the management, it is contemplated that the management may have one or more emails associated with it (e.g., supervisor's email, manager's email, director's email, etc.) and thus an automatic query may be triggered to detect the one or more emails associated with the management before the sales numbers can be emailed to them. It is further contemplated that collection data may carry a value of its own for the user without having to perform any simple or complicated decision or assignment processes, etc. For example, in some embodiment, the user may simply want to query a set of data (e.g., number of employees in foreign offices of a company, travel budget for each member on the management committee, etc.) to be displayed via a visual workflow for viewing by the user via user interface 234.

Similarly, in some embodiments, the collection data may be put through a looping or iteration process to ensure the collection of all the relevant data as necessitated by the nature of the query. For example, the user may wish to collect names and titles of various individuals associated with several accounts of an organization which may trigger looping logic 806 to loop or iterate through each of the several accounts to collect all the names and their corresponding titles from all the accounts. For example, as will be further described with reference to transaction sequence 900 of FIG. 9A, the user may wish to collect the names and titles of various individuals, such as employees, associated with the organization's various offices around the world to assign special privileges (e.g., higher clearance, access to confidential data, traveling privileges, etc.) to those employees who are in management positions (e.g., managers, directors, vice presidents, president, central financial officer ("CFO"), central executive officer ("CEO'), etc.), while status quo may be maintained for all other individuals.

Continuing with the example, in one embodiment, data collection logic 804 may collect the relevant data, such as names and titles of all individuals, which may then be forwarded on to decision logic 808 to determine whether each individual's title includes a management or non-management title (e.g., title=management position? to be answered as a yes or a no, title=management title or non-management title, etc.). In one embodiment, data collection logic 804 may access and obtain all necessary and/or relevant data from one or more database systems, such as database 825, where any amount and type of data may be stored and maintained. Upon completion of the decision process, those individual or group of individuals with management titles may be recognized and assigned to receive special privileges while all other individuals or group of individuals may be maintained at status quo by assignment management logic 810. This process may then continue in one or more loops (e.g., single loop, multiple loops, nested loops, etc.) as facilitated by looping logic 806 until all the necessary and/or relevant data is collected from various accounts associated with the organization and the collection data may then be put through decision and assignment processes as performed by decision logic 808 and assignment management logic 810, respectively.

Upon going through a necessary number of loops, looping logic 806 may terminate further looping and the collected data may then be forwarded on to task enforcement logic 812 to perform one or more tasks as assigned by assignment management logic 810. For example, in this case, task enforcement logic 812 updates the names having management titles with special privileges so they may receive those special privileges and while facilitating other names with non-management titles to continue to function under status quo. As aforementioned, in some embodiments, the looping and other above-referenced processes may be optional where no alteration, filtration, or manipulation of the collection data is necessitated by the query.

In one embodiment, the query results may be communicated back to computing device 830 via communication/compatibility logic 814 and a similar local communication component at computing device 830, where the query results may be presented at computing device 830 in one or more formats (e.g., text, table, graph, etc.) via a visual workflow which may be viewed and manipulated via user interface 834. The results may be locally stored at a local storage of computing device 830 and additional queries may be placed via software application 832 for processing at workflow mechanism 110 over network 820.

Communication/compatibility logic 814 may facilitate the ability to dynamically communicate and stay configured with any number and type of software/application developing tools, models, data processing servers, database platforms and architectures, programming languages and their corresponding platforms, etc. Communication/compatibility logic 814 further facilitates the ability to dynamically communicate and stay configured with various computing devices (e.g., server computing device, mobile computing devices, such as smartphones, tablet computers, laptop, etc.), networks (e.g., cloud network, intranet, the Internet, proximity network, such as Bluetooth®, WiFi®, etc.), websites (e.g., social networking websites, such as Facebook®, LinkedIn®, Google+®, Twitter®, etc.), and the like, while ensuring compatibility with changing technologies, parameters, protocols, standards, etc.

It is contemplated that any number and type of components may be added to and/or removed from collection support engine 800 and/or workflow mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 9A:
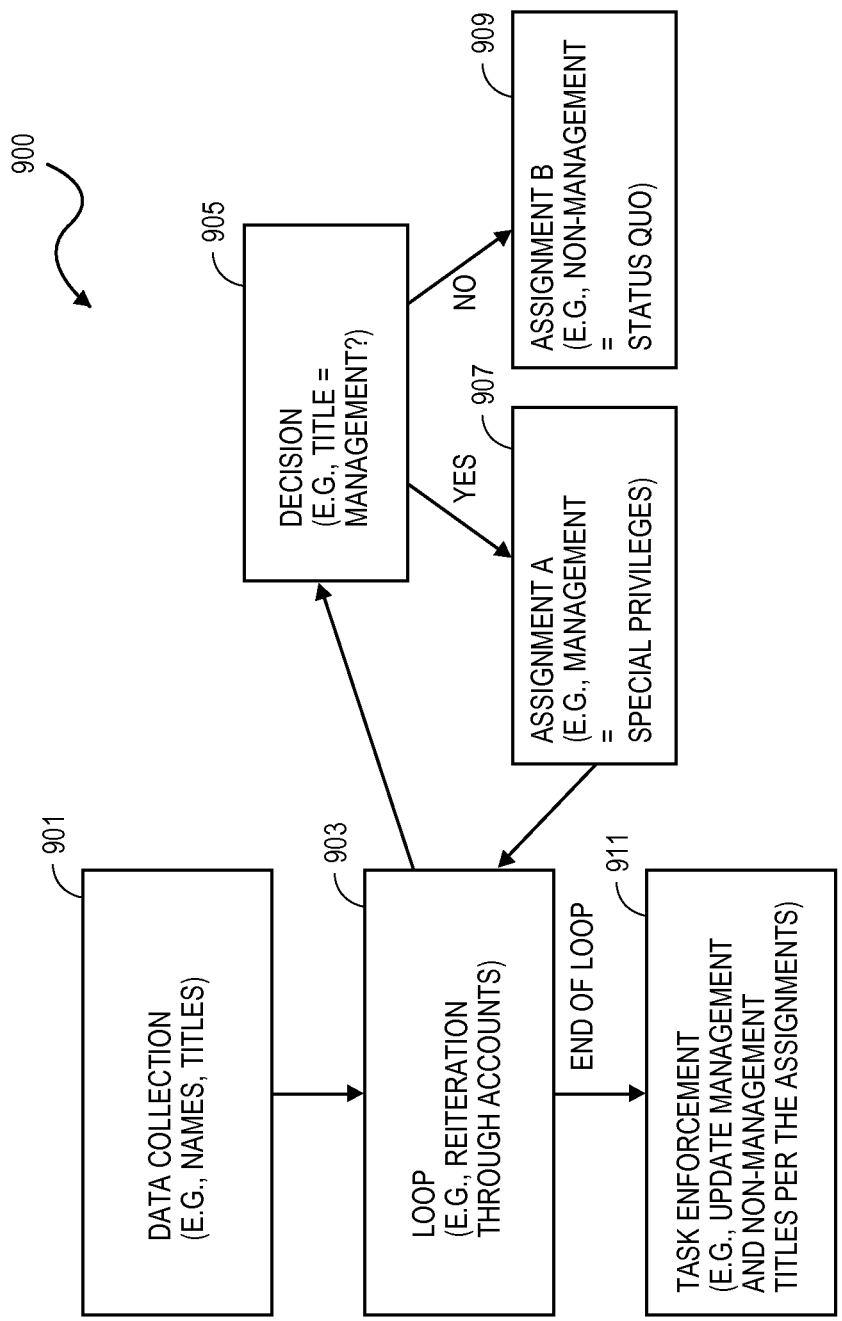
FIG. 9A illustrates a transaction sequence for facilitating collection of data using a collection support engine of FIG. 8 according to one embodiment.

FIG. 9A illustrates a transaction sequence 900 for facilitating collection of data using a collection support engine 800 of FIG. 8 according to one embodiment. Transaction sequence 900 may be performed by processing logic that may comprise hardware (e.g., circuitry, dedicated logic, programmable logic, etc.), software (such as instructions run on a processing device), or a combination thereof. In one embodiment, transaction sequence 900 may be performed by workflow mechanism 110 of FIG. 8. The processes of transaction sequence 900 are illustrated in linear sequences for brevity and clarity in presentation; however, it is contemplated that any number of them can be performed in parallel, asynchronously, or in different orders.

As an initial matter, transaction sequence 900 illustrates a particular case of an embodiment for brevity and ease of understanding, but it is contemplated that embodiments are not so limited. Continuing with one of the examples as discussed with reference to FIG. 8, a user may place a query to search through any number and type of accounts associated with an organization to find individual in management positions so that they may be assigned special privileges (e.g., access to confidential information, higher clearance, etc.). In one embodiment, once the query has been placed and received at collection support engine 800 of FIG. 8, data collection process is triggered at block 901 where any amount and type of information (e.g., names, titles, etc.) about the individuals is collected. It is contemplated that embodiments are not merely limited to individuals and that in some embodiments, the collection of data may relate to a group or groups of individuals, such as a special project team, a finance director and a chief accountant, an entire sales department, etc., where each group may contain two or more individuals.

In one embodiment, after collecting a first set of relevant data, the collection process may then be put through a loop or iteration process, at block 903, if one or more additional sets of relevant data are to be collected. For example, after collecting a first set data, such as names of the individuals, the data collection process may loop through the accounts again so that a second set of data, such as titles of the individuals, may be collected. This collection data is then sent to decision block 905 for further processing. In another embodiment, the data collection process at block 901 may continue to iterate or loop at block 903 for each piece of data relating to each individual. For example, name/title of each individual may be collected separately through continuous looping and then provided to decision block 905 for further processing.

In one embodiment, as previously discussed, the user query may include a decision element to trigger a decision process at decision block 905, such as (in this particular case) is the title associated with each individual a management level title, such as manager, director, vice president, etc. Upon completing the decision process at block 905, the information may then be processed for any corresponding assignments at blocks 907, 909. For example, at block 907, an assignment process is performed for individuals with management titles, such as each individual holding a management level position as identified by the individual's corresponding title is assigned special privileges as requested by the user in the query. Similarly, for example, at block 909, each individual holding a non-management level position as identified by the individual's corresponding title (e.g., salesperson, receptionist, paralegal, etc.) is assigned status quo which, in other words, means none of the privileges associated with such individuals have changed.

In one embodiment, upon completing the assignment process for each individual or, in another embodiment, upon concluding the assignment process for all individuals, a determination may be made as to whether the loop is still is running or is there a need for another iteration at block 903. If the iteration process continues, the process returns to looping at block 903 and continues through the aforementioned processes of collection at block 901, decision at 905, assignment at blocks 907, 909, etc. If, however, the iteration or looping processes have ended, the process then continues with the enforcement of tasks associated with assignments at block 911. Furthermore, continuing with the example, at block 911, any data updates are performed based on the assignments provided in the query, such as the management level titles are updated with their assigned special privileges such that the corresponding individual are then granted and allowed to use the special privileges. Similarly, at block 911, the non-management level titles are left unchanged and remain with their current privileges such that the corresponding individuals are not granted any new or higher special privileges.

Figure 9B:
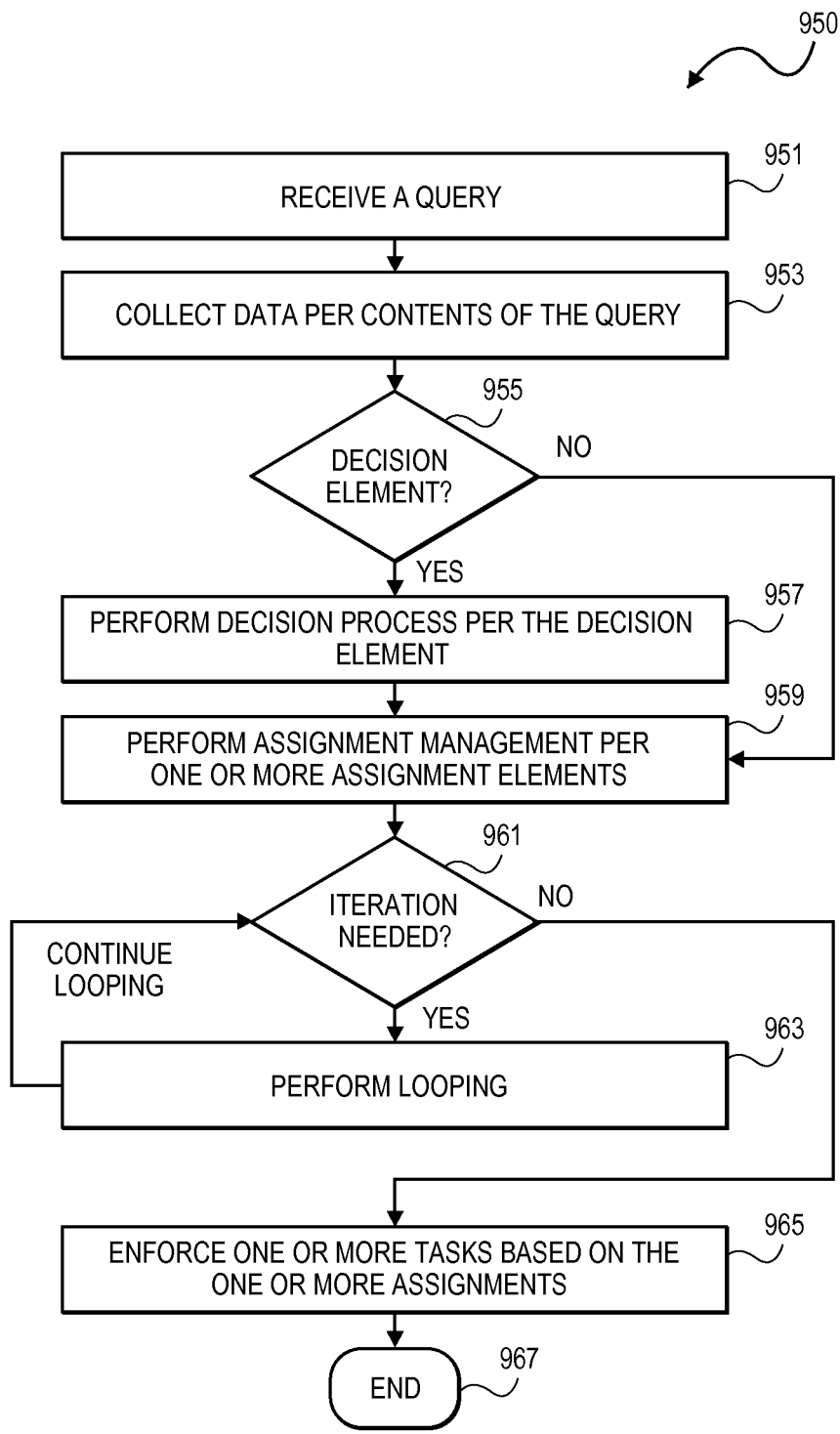
FIG. 9B illustrates a method for facilitating collection of data using a collection support engine of FIG. 8 according to one embodiment.

FIG. 9B illustrates a method 950 for facilitating collection of data using a collection support engine 800 of FIG. 8 according to one embodiment. Method 950 may be performed by processing logic that may comprise hardware (e.g., circuitry, dedicated logic, programmable logic, etc.), software (such as instructions run on a processing device), or a combination thereof. In one embodiment, method 950 may be performed by workflow mechanism 110 of FIG. 8. The processes of method 950 are illustrated in linear sequences for brevity and clarity in presentation; however, it is contemplated that any number of them can be performed in parallel, asynchronously, or in different orders.

Method 950 begins at block 951 with receiving a query placed by a user. At block 953, collection of data is performed based on contents of the query. At block 955, a determination is made as to whether the query contains one or more decision elements. If the query contains a decision element, a decision process is performed per the decision element at block 957. Upon performing the decision process and/or if the query does not contain any decision elements, at block 959, assignment management of the data is performed based one or more assignment elements contained within the query.

In one embodiment, at block 961, a determination is made as to whether any iteration of the process is needed. If any iteration is needed, a looping process is triggered at block 963 or continues, such as multiple iterations of the data collection process. If iteration is not needed or all the iterations have been concluded, the process then continues then enforcing of one or more tasks based on the one or more assignments associated with the data at block 965. Method 950 may then end at block 967.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method performed by a visual workflow-management server computing device ("workflow device") of a database system in a multi-tenant environment having tenants including organizations, the workflow device comprising a hardware processing device coupled to a memory device, wherein the workflow device further comprises a visual workflow mechanism having a visual workflow processing unit that is at least partially embedded in the hardware processing device, the hardware processing device to facilitate the method comprising:
   receiving, by the visual workflow processing unit that is at least partially embedded in the hardware processing device, a query to perform a collection of data relating to a tenant including an organization, wherein the query represents creating a new business process relating to workings of the organization;
   collecting, by the visual workflow processing unit that is at least partially embedded in the hardware processing device, the data from one or more accounts relating to the organization;
   assigning, by the visual workflow processing unit that is at least partially embedded in the hardware processing device, one or more tasks to the collected data;
   performing, by the visual workflow processing unit that is at least partially embedded in the hardware processing device, the one or more tasks;
   dynamically generating, by the visual workflow processing unit that is at least partially embedded in the hardware processing device, a visual workflow in response to the one or more tasks, wherein the visual workflow to facilitate the new business process based on the one or more tasks; and
   displaying, by the visual workflow processing unit that is at least partially embedded in the hardware processing device, the visual workflow at a display device.

2. The method of claim 1, further comprising dynamically iterating, by the workflow device, using one or more loop processes, collecting of the data through multiple accounts associated with the organization as necessitated by contents of the query.

3. The method of claim 1, further comprising dynamically subjecting, by the visual workflow processing unit that is at least partially embedded in the hardware processing device, the collected data to one or more decision processes based on one or more decision elements included in the query.

4. The method of claim 1, wherein the one or more tasks are assigned to the collected data based on one or more assignment elements included in the query, wherein the one or more tasks comprise one or more of delete, print, forward, email, text, add, analyze, assign, delegate, publish, share, lower one or more privileges, increase one or more privileges, and maintain status quo.

5. The method of claim 1, wherein facilitating the new business process comprises amending or deleting an existing business process relating to the workings of the organization, wherein the organization comprises one or more of a business organization, a government agency, a non-profit organization, and an educational institution.

6. A system comprising:
   a visual workflow-management server computing device ("workflow device") of a database system in a multi-tenant environment having tenants including organizations, the workflow device comprising a hardware processing device coupled to a memory device, wherein the workflow device further comprises a visual workflow system having a visual workflow processing unit that is at least partially embedded in the hardware processing device, the hardware processing device to:
   receive a query to perform a collection of data relating to a tenant including an organization, wherein the query represents creating a new business process relating to workings of the organization;
   collect the data from one or more accounts relating to the organization;
   assign one or more tasks to the collected data;
   perform the one or more tasks;
   dynamically generate a visual workflow in response to the one or more tasks, wherein the visual workflow to facilitate the new business process based on the one or more tasks; and
   display the visual workflow at a display device.

7. The system of claim 6, wherein the hardware processing device is further to dynamically iterate, using one or more loop processes, collecting of the data through multiple accounts associated with the organization as necessitated by contents of the query.

8. The system of claim 6, wherein the hardware processing device is further to dynamically subject the collected data to one or more decision processes based on one or more decision elements included in the query.

9. The system of claim 6, wherein the one or more tasks are assigned to the collected data based on one or more assignment elements included in the query, wherein the one or more tasks comprise one or more of delete, print, forward, email, text, add, analyze, assign, delegate, publish, share, lower one or more privileges, increase one or more privileges, and maintain status quo.

10. The system of claim 6, wherein facilitating the new business process comprises amending or deleting an existing business process relating to the workings of the organization, wherein the organization comprises one or more of a business organization, a government agency, a non-profit organization, and an educational institution.

11. A non-transitory machine-readable medium comprising a plurality of instructions which, when executed by a hardware processing device of a visual workflow-management server computing device of a database system in a multi-tenant environment having tenants including organization, cause the hardware processing device to perform operations comprising:

receiving a query to perform a collection of data relating to a tenant including an organization, wherein the query represents creating a new business process relating to workings of the organization;

collecting the data from one or more accounts relating to the organization;

assigning one or more tasks to the collected data;

performing the one or more tasks;

dynamically generating a visual workflow in response to the one or more tasks, wherein the visual workflow to facilitate the new business process based on the one or more tasks; and displaying the visual workflow at a display device.

12. The non-transitory machine-readable medium of claim 11, wherein the operations further comprise dynamically iterating, using one or more loop processes, collecting of the data through multiple accounts associated with the organization as necessitated by contents of the query.

13. The non-transitory machine-readable medium of claim 11, wherein the operations further comprise dynamically subjecting the collected data to one or more decision processes based on one or more decision elements included in the query.

14. The non-transitory machine-readable medium of claim 11, wherein the one or more tasks are assigned to the collected data based on one or more assignment elements included in the query, wherein the one or more tasks comprise one or more of delete, print, forward, email, text, add, analyze, assign, delegate, publish, share, lower one or more privileges, increase one or more privileges, and maintain status quo.

15. The non-transitory machine-readable medium of claim 11, wherein facilitating the new business process comprises amending or deleting an existing business process relating to the workings of the organization, wherein the organization comprises one or more of a business organization, a government agency, a non-profit organization, and an educational institution.

* * * * *